July 19, 1949.  J. SCHUMANN  2,476,631
MOLD AND MOLDING PROCESS
Filed Nov. 1, 1946
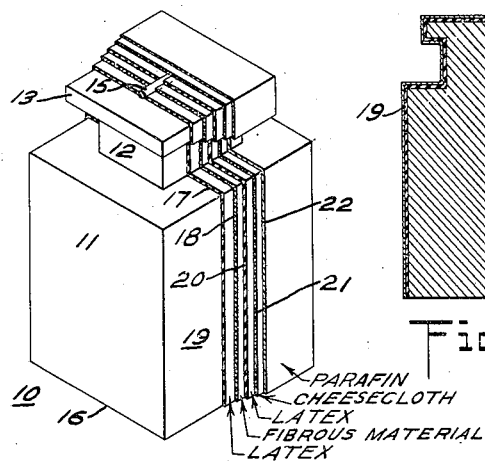
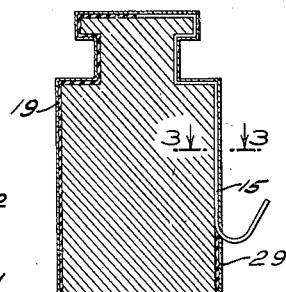
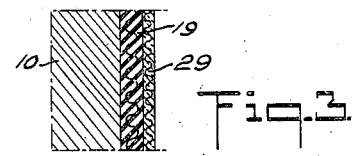
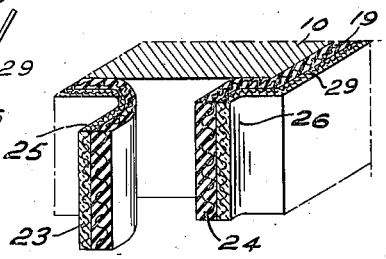
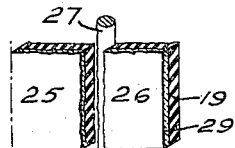
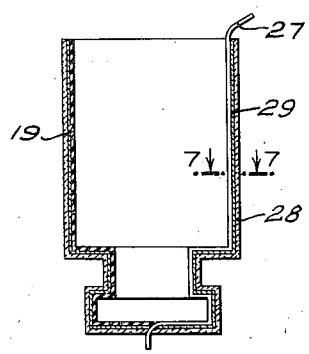
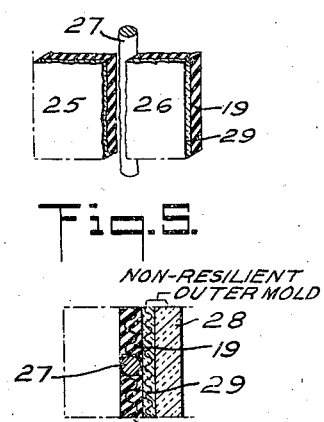
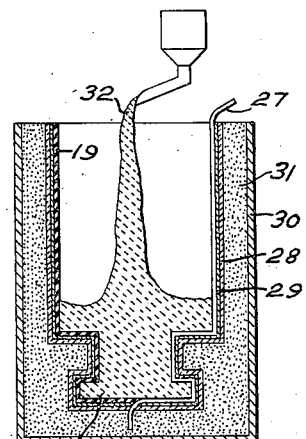
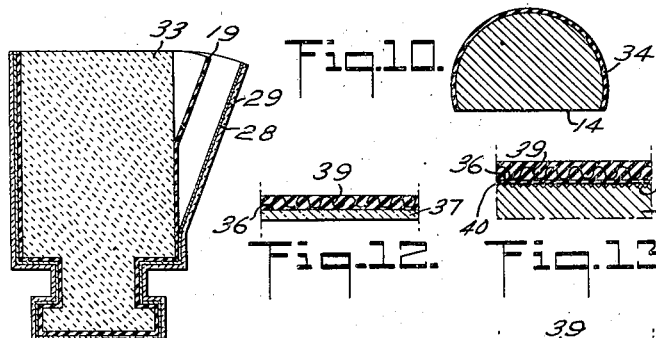
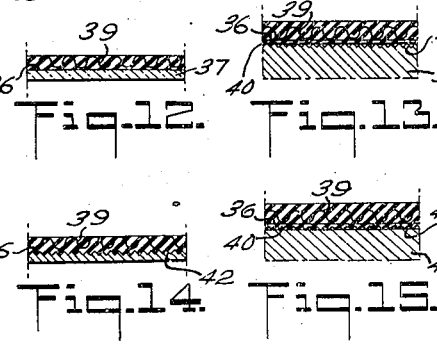
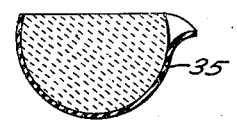
INVENTOR
JOHANNES SCHUMANN
BY
ATTORNEYS Patented July 19, 1949

2,476,631

UNITED STATES PATENT OFFICE 2,476,631

MOLD AND MOLDING PROCESS

Johannes Schumann, Philadelphia, Pa.

Application November 1, 1946, Serial No. 707,209

8 Claims. (Cl. 18—47)

This invention relates to molds and molding processes.

It is among the objects of the invention: to provide an improved molding process; to provide an improved mold; to provide a molding method and apparatus which is cheaper and more adaptable to molding from originals of varied and different contours than the prior art; to provide a molding process by which an original article having undercuts can be easily and quickly reproduced in plaster or the like; to provide a mold for reproducing an original which comprises a two-part mold of which one is superposed upon and removable from the other; to provide without apparatus a soft resilient mold by which reproductions of an original can be easily and quickly accomplished without destroying the mold so that repetition of the reproduction is possible in an elongated series; to provide an inner soft and resilient mold and an outer rigidifying mold arranged to be separated in order to facilitate removal of the reproduction; to provide a mold with a rupturing element to facilitate stripping the mold from the original object and which is arranged to be reassembled with a replacement rupturing element to facilitate removal of the molded reproduction; to provide a mold by which a unitary reproduction of an original can be cast that by ordinary methods and apparatus would require molding in a plurality of separate components for ultimate superposed association in the complete unit; to provide a molding and casting process and apparatus avoiding the necessity of forming an external plaster mold about the original.

Other objects and advantages will appear as the description proceeds.

In carrying out the invention in a preferred embodiment, a soft inner mold is shaped and formed about the original using latex as a coating or saturation of fibrous material, such as upholstery batting, cotton, or wool batting, monks cloth or the like, and this shaping is accomplished by manipulations and dried until the latex has set, and in simple forms of small originals the inner mold thus formed is simply peeled by flexing from the original and forms a hollow mold into which plaster or the like is poured to form a reproduction of the original. The inner mold is then peeled by flexing from the reproduction and further casts are made from the same mold by repetitions of the process until an entire series is formed. The resilience of the reinforced inner mold facilitates this operation and is such as to cause the inner mold to return to its original size and shape after such peeling as has been described. When the original is more complex and is either of appreciable size or of appreciable mass and possessed of undercuts or the like, the procedure is somewhat different in one or two regards. With such more complex shapes and sizes, a cord or the like rupturing element is first laid longitudinally or laterally along part at least of one side of the original extending at least across the undercuts and in the usual case from the lower end to substantially the center of the top, and the inner mold of the latex and fibrous material is shaped and set over the original, and includes the rupturing element between portions of the inner mold, leaving at least one end of the cord free for future manipulations. After the inner mold has thus been shaped and formed and has set, the entire assembly of inner mold and the original is covered with a layer of cheesecloth or analogous loosely woven and thin material and dipped into or otherwise coated with paraffin or the like in a relatively thin coating, which imparts as an outer mold element a certain degree of rigidification to the assembly when sufficiently cooled at room temperature or lower. Then the free end of the rupturing cord is pulled laterally of the assembly from its position in the layer and is torn from the assembly and in so doing cuts or severs both the inner and the outer molds. This cord may be reused as later recited, or can be discarded. The ruptured mold, being open along one side, is then peeled from the original by suitable flexings and manipulations and the original removed. The empty mold assembly of the soft inner mold and the thin outer stiffening reinforcing mold is then brought back into its original shape with a new or the reused cord lying between the abutting edges formed by the initial rupture, which is then also formed as part of the inner contour or surface of the inner mold by adding liquid latex or the like to the cord and the contiguous relatively irregular edges of the ruptured mold assembly. After this has become a unitary assembly, with both ends of the inserted cord preferably extending beyond the external surfaces of the assembly, the restored empty mold is dipped into or otherwise coated with a relatively thick additional paraffin coating and the entire assembly is then placed in a chilling unit to harden the paraffin and to rigidify the entire hollow assembly. After the empty unit has been thoroughly chilled and the paraffin well hardened, the empty mold assembly is inverted so that the open lower end becomes a pouring opening into which plastic plaster, wax, or other hardenable material is poured. Depending somewhat upon the size and proportions of the original, the rigidifying outer mold of the paraffin and cheesecloth enclosing the inner mold may be first packed in cracked ice, chilled soap solution, chilled sand, or the like, to maintain the hardened condition of the paraffin during the molding operation of casting the plastic therein. In some cases the mold is permitted to sink into the chilled soap solution as a displacement function of the pouring of the casting material. The latex and fiber composition of the soft and resilient inner mold forms a thermal insulating composition to minimize heat transfer from the plaster of Paris mixture or the like being poured into the open mouth of the mold assembly, which in the normal course of small units is sufficient to enable maintenance of the rigidity of the assembly by the retention of the paraffin hardness until the plaster has set. With the larger pieces this, as noted, is augmented by the surrounding chill incident on the paraffin. After the reproduction of the original in the mold has set, the outer mold comprised of the paraffin and cheesecloth is stripped from the soft inner mold, then the inserted rip cord is torn out from the inner mold to form the separation in the mold to enable the inner mold to be stripped or peeled from the reproduction. The empty soft inner mold thus remaining may then be completed by a new insertion of a rip cord, sealed with latex to form a closed inner mold unit, pursuant to which the cheesecloth and thick paraffin coating can be applied, the rigidified empty mold assembly can then again be chilled, and an additional reproduction can be poured, and so on. There are some additional refinements which will be pointed out later herein.

In the accompanying drawings forming part of this description:

Fig. 1 represents a fragmentary perspective of an article designated as an "original" to be reproduced, showing in stripped away sections the successive layers applied to the original in the formation of the ultimate mold assembly comprised of a resilient inner mold and a rigidifying outer mold.

Fig. 2 represents a transverse vertical section through the original and the superposed layers, showing the position of the parts including the rupturing cord after the beginning of the rupturing step by the completion of which the mold can be stripped from the original.

Fig. 3 represents a fragmentary enlarged section of the assembly of Fig. 2 taken on the line 3—3 thereof.

Fig. 4 represents a fragmentary perspective view of the original unit with the superposed layers of the two-piece mold in its condition following completion of the rupture indicated in Fig. 2 as having just begun.

Fig. 5 represents a fragmentary perspective of two portions of the once ruptured assembled inner flexible mold and outer thin rigidifying mold, showing a rupturing cord or thread laid between the ruptured edges thereof preparatory to adhesion therein by a latex coating, as a preliminary to ultimate re-rupture.

Fig. 6 represents the assembled hollow mold formed of the inner and outer separable mold portions with the thread inlaid as indicated in the preliminary step shown in Fig. 5, ready for casting a reproduction.

Fig. 7 represents a fragmentary transverse section through the empty assembled mold taken on line 7—7 of Fig. 6.

Fig. 8 represents a transverse vertical section of the assembled inner and outer mold encased in chilled sand, chopped ice, or the like, during the pouring of the plastic material to form the ultimate reproduction.

Fig. 9 represents a vertical transverse section through the finished poured mold assembly of Fig. 8, showing the beginning of the stripping of the outer rigidifying mold from the soft resilient inner mold to indicate the manner thereof, and the beginning of the stripping of the soft inner resilient mold from the reproduction unit according to the manner, but not necessarily the timing thereof, as preferably the outer rigidifying mold layer will be completely stripped from the soft flexible inner mold before the latter is removed from the molded reproduction after severance or rupture of both by removal of the inlaid rupturing cord shown in Fig. 6.

Fig. 10 represents a modified form of mold in transverse vertical section, in which the inner soft mold is formed over a sufficiently small original as to be capable of being stripped or peeled therefrom without rupture and without any outer rigidifying mold.

Fig. 11 shows a view similar to that of Fig. 10, in which the flexible inner mold after being stripped from the original has received a plastic material which has solidified to form a reproduction, with the start of stripping of the flexible inner mold from the reproduction.

Fig. 12 represents a fragmentary transverse section through a preliminary assembly of the soft inner mold to receive a glaze in order to smooth out somewhat the external roughness that may attach to an original having a rougher surface than is desired in the reproductions.

Fig. 13 represents a fragmentary transverse section of the preliminary treated soft inner mold layer of Fig. 12, as applied to an original having a superficial surface which is rougher than is desired in the reproductions.

Fig. 14 represents a fragmentary transverse section through a preliminary assembly of the soft inner mold to receive a preliminary internal roughness to reduce the smoothness that may attach to a too smooth original.

Fig. 15 represents a fragmentary enlarged section through the preliminarily treated inner mold material of Fig. 14, as applied to an original having a smooth surface which is desired to be made rougher in the finished reproduction.

Referring to Fig. 1 and its related figures, there is shown a fanciful original which it is desired to reproduce with a number of reproductions formed of plaster or the like, and obviously this is of the most general sort, as any original such as objects of art or asymmetrically shaped units, may be similarly treated and reproduced according to this invention. For purely illustrative purposes, the original 10 will be considered as having an enlarged generally rectangular base portion 11, a reduced neck portion 12, and an enlarged head portion 13. The reduced neck 12 and the enlarged head 13 provide an illustration of an undercut structure which ordinary molding processes find extremely difficult. The original 10 may be considered to have appreciable bulk so as to warrant the various steps that are taken in the explanation relative thereto, as distinct, for instance, from the simple form and small bulk of the original 14 shown in Fig. 10, to be later described.

Assuming that the superficial surface of the original 10 is the surface which is to be reproduced on the reproductions, and thus does not come within the purview of the portions of the invention illustrated either in Figs. 12 and 13, or Figs. 14 and 15, where a different superficial surface is to be secured from the reproduction from that possessed by the original, as will be later explained, the soft inner mold is prepared and applied. To do that, a quantity of fibrous material such as the various types of batting already described, or monks cloth, or other loosely woven fibrous material, cut to the general shape of the original, is provided and coated with liquid latex, preferably of the synthetic type represented illustratively and purely for instance by buna rubber, and this is worked thoroughly through the fibrous material so that preferably a saturation of the fibrous material is attained. With a thin layer of the fibrous material suitable saturation can be obtained by simply coating one surface thereof with the latex. This material so worked and in soft and pliable semi-plastic condition is then applied to the external surfaces of the entire assembly, after first laying in a rupture cord 15. This material is pushed manually and worked until the entire mass covers and intimately contacts with the entire external surface of the original 10, above the base end 16 thereof. If desired, after so shaping and pushing and compressing the plastic mass about the original an additional coating of the liquid latex can be given to the external surfaces of the mass so that there is in contact with the outer surfaces of the original a first layer of latex 17 intimately bonded with a layer or layers of fibrous material 18 and finished by an additional layer of latex 20. This inner mold is generically designated in its assembly as 19. The additional layer 20 of the inner mold 19 is of dual functions in that it first increases the resilient mass for strength, and secondly it forms a surface to which paraffin finds it difficult to adhere.

This mixture of components 17, 18, and 20, which for all practical purposes is a single homogeneous layer 19, is permitted to solidify or set so as to retain the shape imparted to it by its contact with the original. In order to rigidify the inner resilient soft mold 19 thus formed, it is preferred with such shapes as shown or those possessed of similar problems, to then apply a layer of cheesecloth or the like 21 free edges of which are juxtaposed to the line of the rupture cord, primarily as an aid in stripping the paraffin from the mold, to which a more or less thin layer of paraffin is applied as indicated at 22. For convenience, the loosely woven layer such as cheesecloth 21 and the layer of paraffin 22 will be considered as a stiffened unitary outer mold 29. The entire assembly can then be placed in a refrigerator to expedite the hardening of the rigid external or outer mold, and after this has been accomplished, or in the absence of such additional hardening as attaches to lowering below room temperatures, the assembled mold is ready for stripping from the original. To this end the rupture cord 15 is pulled laterally with sufficient strength and for a sufficient distance as to rupture the inner and superposed outer assembly along a portion at least of one side of the assembled mold as to include all of the undercut surfaces of the orginal. This furnishes two ruptured surfaces 23 and 24, as indicated in Fig. 4, at the margins of two assembled mold components or portions respectively 25 and 26, which are integral and contiguous with the remainder of the assembled mold. By suitably separating the edge portions 25 and 26 and flexing the assembled mold in its various parts as necessary, the entire split assembled mold can be stripped from the original, during which the portions which are not actually flexed retain the rigidifying outer layer or mold formed of the thin paraffin and cheesecloth, whereas those portions which are most violently flexed may experience a certain amount of cracking and rupture and loss of rigidity of the paraffin coating only. This does not matter very much as the main body continues to be reinforced even during the process of removing of the original from the assembly of the inner and outer mold.

Upon removal of the original from the mutilated or ruptured assembly of inner and outer molds, the juxtaposed portions 25 and 26 are pushed or naturally flexed together due to its inherent resilience into the initial form occupied by the assembled mold on the original prior to the initial rupturing, and a secondary rupture or rip cord 27 is laid between and in contact with the contiguous juxtaposed edges 23 and 24, and secured therein as a substantial continuation of the inner surface of the assembled mold by a suitable coating of liquid latex, which secures the cord in place and completes the mold assembly when it relatively cures or becomes set.

When the last mentioned small amount of latex has set, the preliminary stiffened inner mold (stiffened by the relatively thin coating of paraffin and cheesecloth initially applied), is dipped in or otherwise coated by a heavier layer of paraffin 28 to complete the casting mold assembly shown in Fig. 6, and in detail in the section shown in Fig. 7. In this case also any irregularity in the contour of the inner mold due to the interruption formed by the raw or ruptured edges 23 and 24 and the inlaid cord 27 is covered and the entire mold assembly formed into a rigid unit complete throughout its entire periphery. In this situation also, preferably, both free ends of the cord 27 extend from the inner mold. The empty assembly shown in Fig. 6 is then preferably placed in a refrigerator, or placed in chopped ice or the like to insure the complete hardness and rigidity of the outer mold, and thus of the rigidity of the entire mold assembly of inner and outer molds.

After the paraffin has suitably chilled, if necessary the empty mold assembly of Fig. 6 is placed in a container 30 and chilled sand, chopped ice or other chilling medium 31 is poured into the container externally of the empty mold assembly to establish a source of heat absorption in contact with the entire outer surface of the mold assembly to maintain the hardness thereof during casting. In any event, plaster of Paris, or the like, in suitable water mixture as to form a pourable plaster, as 32, is then poured into the empty mold as shown in Fig. 8, until the mold assembly is filled, and is permitted to solidify or harden in the mold assembly, in a cast reproduction 33. Owing to the density factors in certain cases, chilled soap solution is provided and the assembled empty mold floats close to the surface thereof, and the plastic mass is formed therein starting at that mold position as the weight of plaster in the mold increases the gradually filling mold assembly sinks in the chilled soap solution, to progressively apply its chilling action to the mold assembly synchronously with the disposition of and at the level of the heated material in the mold.

After the plaster of Paris or similar casting material has set, the rip or rupture cord 27 is pulled, the entire outer rigidifying mold is torn from the inner mold, utilizing the functions of the cheesecloth for the purpose, again splitting the inner mold relative to the contained casting 33, as indicated by the separated portion of the outer mold shown in Fig. 9. The ruptured soft flexible inner mold is then stripped from the reproduction 33, and if another reproduction is desired the recited procedure is repeated. Any slight irregularity in the surface of the reproduction incident to exposure to the inserted rip cord or otherwise can easily be buffed or ground off to cause the reproduction to be a true simulation of the original.

In Fig. 10 there is illustrated a simple original 14, of small mass, to which a coating of latex alone, or a mixture of latex and fibrous material can be applied for the formation of the inner soft resilient mold only. The inner mold thus formed indicated at 34, due to its resilience, can be peeled directly from the original 14 without splitting or rupture, and when empty can be inverted as shown in Fig. 11 and will retain its given shape during the pouring of the plastic mixture which when solidified and set forms the reproduction 35. In this case the inner mold used may not need any external or outer rigidifying mold, although this can be provided if desired. In the formation of this or any other mold it is sometimes of assistance to impart a thin coating of latex as a liquid or semi-liquid coating directly to the surface of the original, prior to the application of the inner mold-forming mixture of latex and fiber, as the fidelity of impression of intimate detail is thereby accentuated.

In certain cases it is found that the superficial surface of the original may be too rough or too smooth for the desired superficial surface to be imparted to the reproductions. In the case of the rough surface to be reproduced as somewhat smoother or vice versa, it is preferred to pre-treat the material forming the inner flexible mold. Thus, referring to Fig. 12, a layer of the fibrous material 39 is coated with a coating of latex 36 and pressed against the glazed surface of a china or metal plate 37 or the like which imparts a glaze to the surface of the latex layer 36 when it has set. When this glazed sheet is coated with additional latex 40 and pressed against the roughened surface 41 of an original 38, the liquid latex conforms to a compromise surface partaking partially of the nature of both the glaze and the rough surface, to effect a surface of diminished roughness relative to the actual roughness of the actual original surface, and this resultant surface becomes the actual surface effect produced upon the ultimate reproduction. In the event that the original is possessed of a superficial surface which is considered too smooth for the desired effect on the reproductions the layer 39 of the fibrous material is coated with the coating of latex 36, which latter is pressed against the rough surface 42 of an object like a plate 43. After this has set, the further superficial coating of latex 40 is applied to the pre-treated mixture of fiber and latex and the assembly is pressed against the smooth surface 45 of the original 46. In setting, the ultimate actual superficial surface of the soft inner mold unit partakes of a mixture or a resultant of both the pre-treated rough surface and the smooth surface of the original to effect a partially roughened surface which is imparted to the reproductions.

It is to be understood that the outer mold, comprised of the paraffin does not need the cheesecloth underlayer for the purposes of the invention. A solid layer of paraffin can be applied and serve the purposes, and can be removed by cracking and peeling, or by melting and running off, but the cheesecloth or like thin loosely woven material both reinforces the paraffin in tension and shear, while facilitating the ready removal of the entire body of paraffin with the cheesecloth. It makes a clean job of the paraffin removal. It will also be clear that paraffin is a cheap and freely available material, but it will also be apparent that other materials having the properties of ready and facile application and which are subsequently subject to stiffening or hardening are also available and may be used in alternation or conjunction with the paraffin. On the other hand, the paraffin can be remelted and re-used. Similarly, the range of synthetic plastics available for the formation of the soft resilient inner mold is also quite wide, and the term "latex" as used is to have a broad significance to cover any material capable of application in a liquid or semi-liquid or plastic state, and which sets into a resilient body, unless otherwise specifically limited in the claims hereinafter appearing. Finally, it will be understood that in the usual course the reproductions are to be made of any material capable of flowing to fill the mold, followed by subsequent setting to form the reproduction, whether this be plaster, plaster of Paris, wax, or any of the synthetic or natural plastics capable of such functioning.

It will be evident that in many cases the casting of the molded reproductions will not need any other opening in the mold than that through which the reproduction material is to be inserted, and that the original objects generally similar to the original 14 of Fig. 10 can be taken out of the formed inner mold by turning the mold inside out and pulling it off of the original in a manner similar to the removal of a glove from a hand. It will be seen that in the other forms of invention shown, the presence of a rupture line is necessary on one side only as the opposite side flexes or bends when the inner mold is opened, either for the removal of the original or of the reproduction. It will also be clear that in many cases the rupture line need only extend part way of the full length of the inner mold, as the unslit or unopened or ruptured part can be sealed from the enclosed unit. It will be understood further that the original or the reproductions may be removed with the aid of a razor slit in place of a predisposed rip cord, and such slits can be sealed by a simple latex gluing between the slit edges.

It will be understood further that in cases where removal of the inner mold does not require excessive bending or flexing or stretching in removal, as, for instance, a mold formed on a human or other face, a bas-relief, or the like, the inner mold can be formed of the latex alone without the fibrous material as a reinforcement, and the mold can be lifted directly from the original.

Having described my invention, I claim:

1. A mold for making casts, comprising a layer of latex substantially dried to form a soft resilient inner mold, and a superposed stiffening mold of paraffin formed thereon.

2. A mold for making casts, comprising two separable parts, of which the inner mold is formed of latex and the outer separable mold is formed of paraffin.

3. A mold for making casts comprising two separable parts, of which the inner mold comprises latex and fibrous latex-permeable material, and the outer mold part of which comprises paraffin conforming to the external contour of the inner mold.

4. The method of casting a reproduction of an original which comprises applying liquid latex to a body of latex permeable fibrous material, shaping the body to the contours of the original to be reproduced, substantially drying the latex in situ on the original to form a soft inner resilient mold, applying a coating of paraffin to the external surfaces of the inner mold, hardening same, and removing the original from the inner mold by flexing the latter.

5. The method of casting which comprises applying a latex-coated fibrous layer upon and conforming it to an original, substantially drying the latex to form a soft resilient inner mold, coating the inner mold with an outer mold comprised of a relatively thin layer of paraffin, hardening the paraffin, slitting the soft inner mold and the paraffin outer mold, removing the original from the inner mold by separating the edges of the slit and flexing the inner and outer molds relative to the original, and closing the slit.

6. The method of casting which comprises saturating fibrous material with liquid latex, applying a rip cord to an edge of an original, applying the saturated fibrous material to the original and conforming it thereto including the rip cord, permitting the latex to substantially set to form a soft resilient inner mold, utilizing the rip cord to form a slit in the inner mold, separating the edges of the slit and flexing the inner mold to remove the original therefrom, closing the slit of the empty inner mold with a latex coated rip cord, and applying a thermoplastic rigidifying outer mold to the inner mold.

7. The method of casting which comprises applying liquid latex to both sides of a fibrous layer, shaping and conforming the layer to the surface of an original to enclose same except at the base of the original, permitting the latex to substantially dry to form a resilient inner mold, encasing the inner mold with loosely woven material, coating the woven material with a relatively thin outer rigidifying layer of paraffin, slitting the inner and outer molds, removing the original therefrom by flexing the inner mold, sealing the slit in the empty mold, applying a relatively thick coating of paraffin to the first layer of paraffin and the exposed portions of the inner mold, and hardening the outer mold by exposing it to chilling temperature.

8. The method of forming a mold as a preliminary to casting which comprises coating soft fibrous material with latex, conforming the coated fibrous material to the original to be reproduced, coating the conformed material with liquid paraffin to form a non-frangible reinforcing layer, chilling the paraffin coating to render it stiff, causing a slit-like opening to be formed through the fibrous material so as to form flaps capable of limited flexing, removing the original with the aid of such limited flexing and substantially restoring the unslit nature of the fibrous material.

JOHANNES SCHUMANN.

REFERENCES CITED

The following references are of record in the file of this patent:

UNITED STATES PATENTS

| Number | Name | Date |
| --- | --- | --- |
| 748,996 | Spencer | Jan. 5, 1904 |
| 996,783 | Moreau | July 4, 1911 |
| 1,902,627 | Elbogen | Mar. 21, 1933 |
| 2,083,484 | Zampol | June 8, 1937 |
| 2,172,466 | Edwardes et al. | Sept. 12, 1939 |
| 2,246,332 | Whiteley, Jr. | June 17, 1941 |
| 2,251,785 | Dons et al. | Aug. 5, 1941 |
| 2,388,776 | Wallace | Nov. 13, 1945 |